United States Patent [19]

Mizuno et al.

[11] Patent Number: 5,412,271
[45] Date of Patent: May 2, 1995

[54] SMALL SIZED ELECTRIC MOTOR EQUIPPED WITH AN ELECTRIC CONNECTOR

[75] Inventors: Yoshiyuki Mizuno, Sagamihara; Hidehiro Ii, Koube; Satoshi Suzuki, Nagareyama; Yukihisa Tonooka, Matsudo, all of Japan

[73] Assignee: Molex Incorporated - Mabuchi Motor Co., Ltd., Lisle, Ill.

[21] Appl. No.: 287,994

[22] Filed: Aug. 9, 1994

[30] Foreign Application Priority Data

Aug. 25, 1993 [JP] Japan .............................. 5-050819 U

[51] Int. Cl.⁶ .............................................. H02K 5/22
[52] U.S. Cl. ................................ 310/71; 310/40 MM; 310/42
[58] Field of Search .............. 310/40 MM, 42, 71, 89, 310/90, DIG. 6; 439/577, 926

[56] References Cited

U.S. PATENT DOCUMENTS

| | | | |
|---|---|---|---|
| 4,056,749 | 11/1977 | Carlson, Jr. et al. | 310/239 |
| 4,616,149 | 10/1986 | Best | 310/71 |
| 5,126,608 | 6/1992 | Sogabe et al. | 310/71 |
| 5,204,565 | 4/1993 | Sekine et al. | 310/71 |
| 5,218,254 | 6/1993 | Someya | 310/71 |
| 5,281,876 | 1/1994 | Sato | 310/40 MM |
| 5,287,028 | 2/1994 | Suzuki et al. | 310/71 |
| 5,343,102 | 8/1994 | Mabuchi et al. | 310/71 |

*Primary Examiner*—Steven L. Stephan
*Assistant Examiner*—D. R. Haszko
*Attorney, Agent, or Firm*—Stephen Z. Weiss

[57] ABSTRACT

Disclosed is a small-sized electric motor equipped with an improved electric connector, which prevents high forces being exerted on exposed conductors of an insulated wire in the course of insertion or withdrawal of the exposed conductors from the connector housing, thereby preventing the rubbing between the exposed conductors and the terminal contacts of the electric connector.

The electric connector includes an actuator. The actuator, when fully inserted in said connector housing, is adapted to push the exposed conductors against the contacts of the contact beams of the terminals, thereby causing the contact beams of the terminals to be forced into the exposed conductors.

2 Claims, 11 Drawing Sheets

FIG. 12
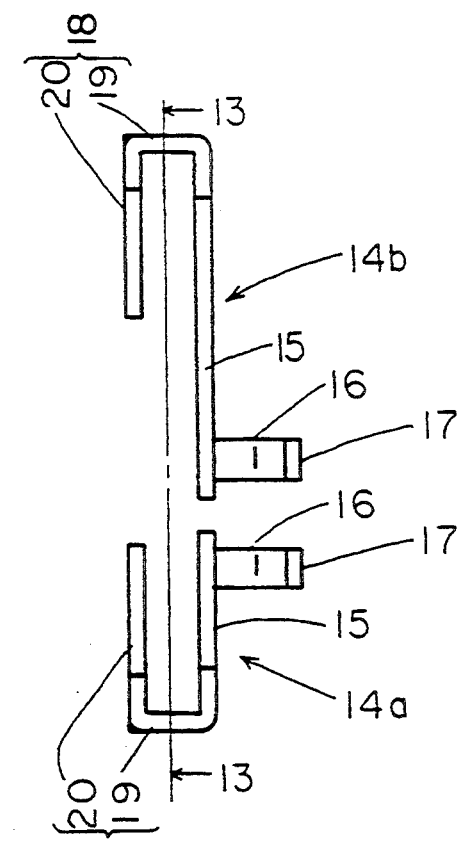
FIG. 13
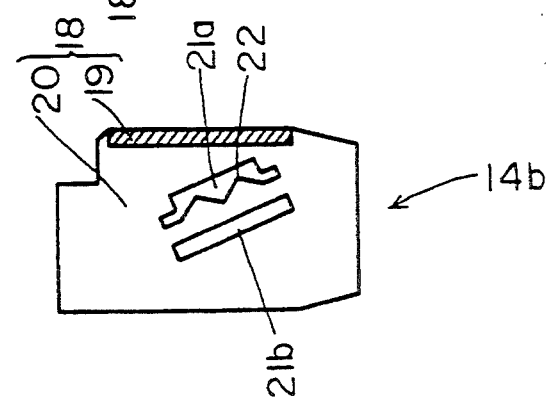
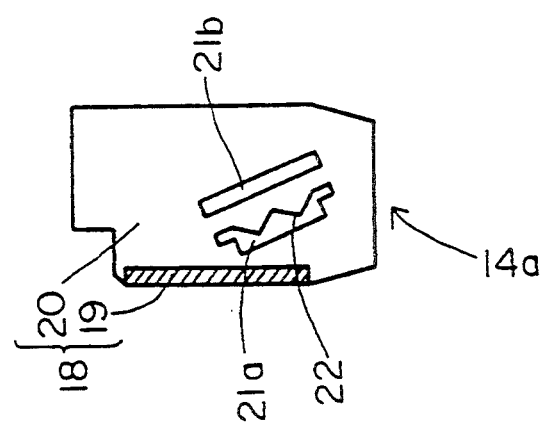

SMALL SIZED ELECTRIC MOTOR EQUIPPED WITH AN ELECTRIC CONNECTOR

FIELD OF THE INVENTION

The present invention relates to electric connector terminals, electric connectors and an electric connector assembling method, particularly to an improvement in or relating to electric connector terminals and electric connectors designed to be integrally connected to blade terminals on electric machines and appliances.

BACKGROUND OF THE INVENTION

As is well known, required electric connections between the input terminals (or electrodes) of electric machines and appliances such as small-sized electric motors and associated electric power supplies or controls were made by soldering or crimping wires to the input terminals (or electrodes) of electric machines and appliances and to the conductors extending from the electric power supplies or controls.

Such wire-soldered or wire-crimped connections, however, required laborious works, and still disadvantageously, connection to and disconnection from exterior conductors could not be performed with ease.

U.S. Pat. No. 5,287,028 proposed a connector housing integrally connected to an electric motor. The connector housing has an electric connector fitted therein with the inner terminals designed to be connected to the input terminals of the electric motor and the outer terminals designed to be detachably connected to the exterior lead wires extending from an associated power supply or control for making required electric connections between the electric motor and the associated power supply or control.

In this prior art insertion of exterior conductors into the connector housing causes the terminal contacts in the connector housing to be resiliently deformed, thereby causing the resilient counter force in the terminal contacts to push themselves against the external conductors, thus making the required electric connection to the exterior conductors. If disconnection of the exterior conductors from the terminal contacts in the connector housing is desired, the exterior conductor must be pulled out from the connector housing against the contact force which is applied to the exterior conductors by the terminal contacts.

The conventional electric connector, however, has the following disadvantages:

First, both at the time of connecting to and disconnecting exterior conductors from the terminal contacts in the connector housing for external conductors must be pushed forward for insertion or must be pulled backward for disconnection against the contact force which is applied to the exterior conductors by the terminal contacts. Therefore, there is a fear for damaging exterior conductors by the rubbing between the exterior conductors and the terminal contacts.

Second, the terminal contacts in the connector housing must be designed to apply to exterior conductors a contact force strong enough to assure good contact between the terminal contacts and the exterior conductors, still facilitating insertion of the exterior conductors, in the connector housing, and at the same time facilitating withdrawal of the exterior conductors from the connector housing. It is, however, difficult that terminal contacts are designed so as to have a contact force of appropriate strength for the purpose.

SUMMARY OF THE INVENTION

One object of the present invention is to provide a small-sized electric motor equipped with an electric connector having terminals which permit application of a relatively strong contact force to exposed conductors of an insulated wire when being held in the connector housing, preventing application of such a relatively strong contact force to such conductors when withdrawn and removed from the connector housing, thereby preventing the rubbing between the terminals and the exposed conductors.

Another object of the present invention is to provide a small-sized electric motor equipped with an electric connector which has means to facilitate the designing of terminal contact force appropriately for the purpose.

To attain these objects a small-sized electric motor equipped with an electric connector is offered which permits connection of exposed cable conductors to the input terminals of the electric motor, and disconnection of exposed cable conductors from the input terminals of the electric motor. The electric connector includes an actuator which is adapted to hold the contact beams of the terminals in the connector housing without causing any resilient deformation both in the course of insertion of the exposed cable conductors in the connector housing for making electric connections between the terminals and the exposed cable conductors. In the course of withdrawal of the exposed cable conductors from the connector housing to disconnect the exterior conductors from the terminals, the actuator, when fully inserted in said connector housing, is adapted to push the exposed cable conductors against the contact beams of the terminals, thereby resiliently deforming the contact beams of said terminals to cause the contact beams to apply a counter force to the exposed cable conductors.

With this arrangement the connection or disconnection can be performed through a single snap-on or snap-off action. Also, advantageously there is no fear of damaging exposed cable conductor surfaces by the rubbing which otherwise, would be caused between the terminals and the exposed conductors. Only a minimum insertion or withdrawal force is required due to no frictional rubbing between the terminals and the conductors. A most appropriate contacting force with which the exterior conductors can be pushed against the terminal contacts in the connector housing, can be determined without taking any consideration to the forces which are required for insertion or withdrawal The actuator may have lock arms integrally connected on its opposite sides, each of said lock arms having a lock projection to be caught by each of counter projections formed in the connector housing when the actuator is fully inserted therein. This arrangement permits the positive engagement between the connector housing and the actuator.

In use, particularly in connecting the small-sized electric motor to exposed cable conductors, the front end of the actuator is inserted in the inlet opening of the connector housing with the exterior conductors laid under the bottom surface of the actuator. The exposed cable conductors are pushed forward until they are along the rising extension of the "U"-shaped contact beams. In this position only the front end of the actuator is inserted in the connector housing, and the exposed conductors extend beyond the forward end of the actuator, but are not pressed against the ends of the terminals by the actuator. Therefore, the ends of the contact beams cannot be rubbed by the exposed cable conductors in the course of insertion.

Thereafter, the actuator is fully inserted in the connector housing. In this position the exposed conductors are pushed against the terminal extensions of the contact beams, and then the contact beams are yieldingly bent down, forcing them against the overlying conductors to assure good electric connection with the exposed conductors. The exposed conductors can be disconnected from the terminals by operating the actuator in the reversed order. In the course of disconnection, the rubbing between the exposed conductors and the terminal Contacts is avoided because the exposed conductors are not pressed against the contact extensions of the contact beams when the exposed conductors are removed along with the actuator.

BRIEF DESCRIPTION OF THE DRAWINGS

Other objects and advantages of the present invention will be understood from the following description of preferred embodiments of the present invention which are shown in accompanying drawings:

FIG. 12 is a side view of the terminal contacts as seen in the direction indicated by W in FIG. 9;

FIG. 13 is a longitudinal section of the terminal contacts taken along the line 13—13 as seen in the direction indicated by arrow in FIG. 12;

DETAILED DESCRIPTION OF THE PREFERRED EMBODIMENT

Figure 1:
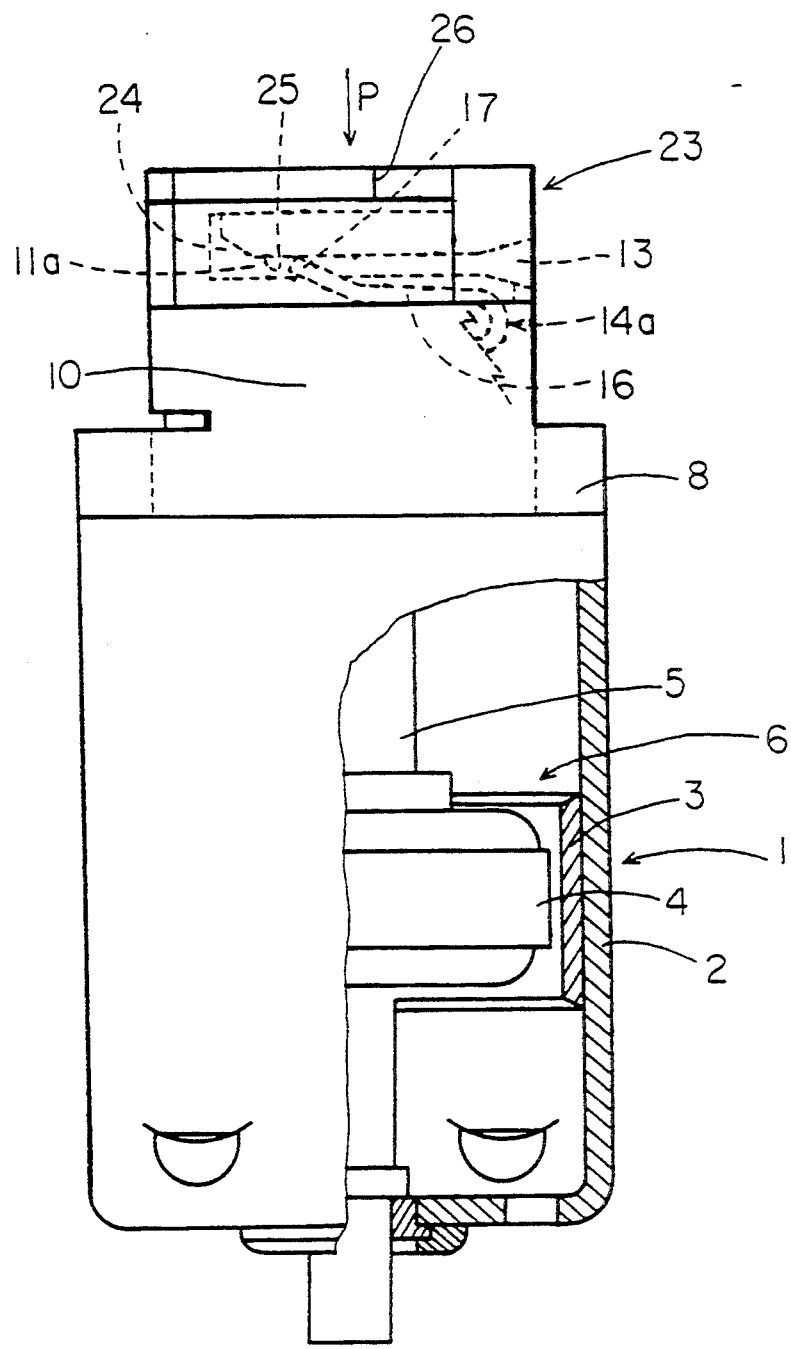
FIG. 1 is a front view of a small-sized electric motor equipped with an electric connector according to the present invention, with the electric motor shown in partial cross section.
Figure 2:
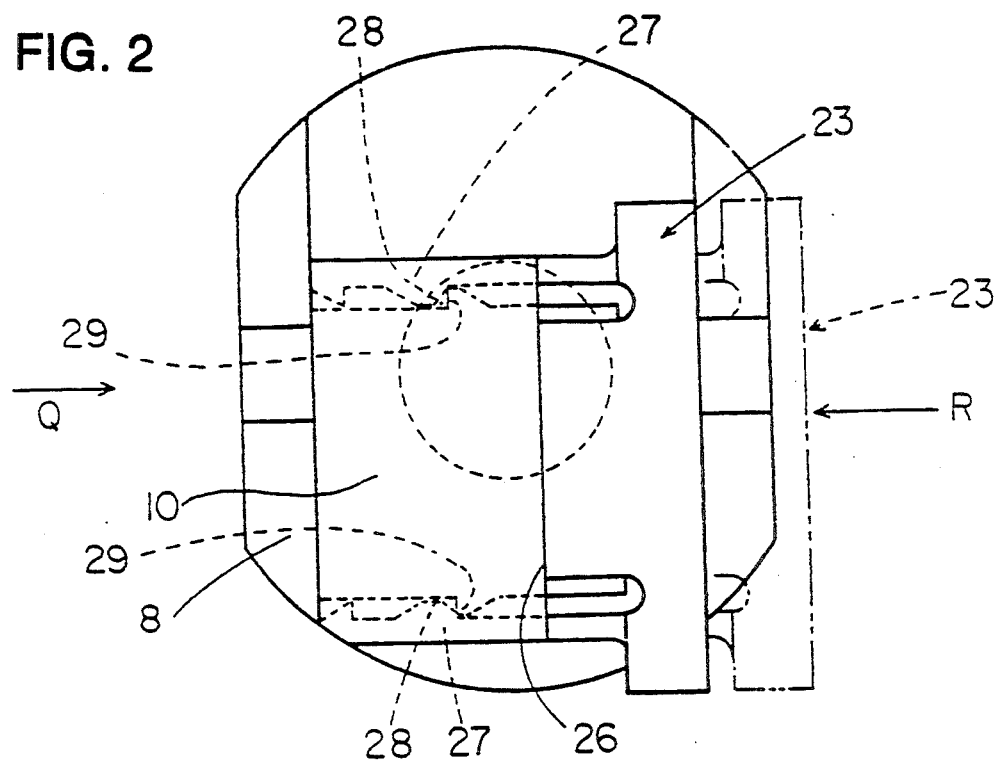
FIG. 2 is a top view of the small-sized electric motor as seen in the direction indicated by P in FIG. 1.
Figure 3:
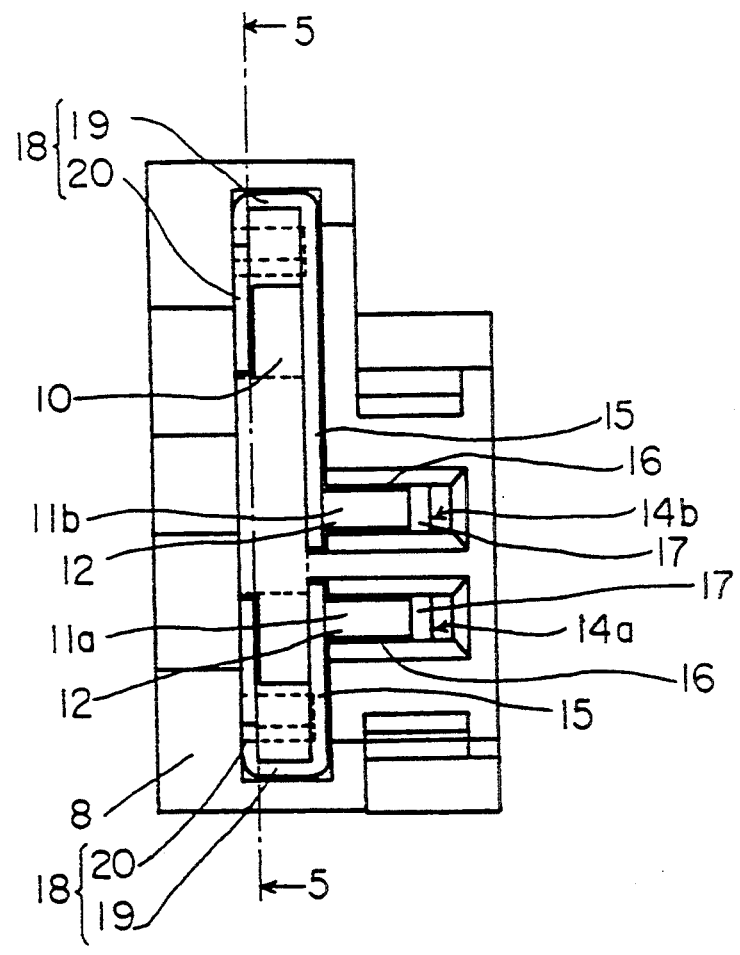
FIG. 3 is a side view of the connector housing as seen in the direction indicated by Q in FIG. 2.
Figure 4:
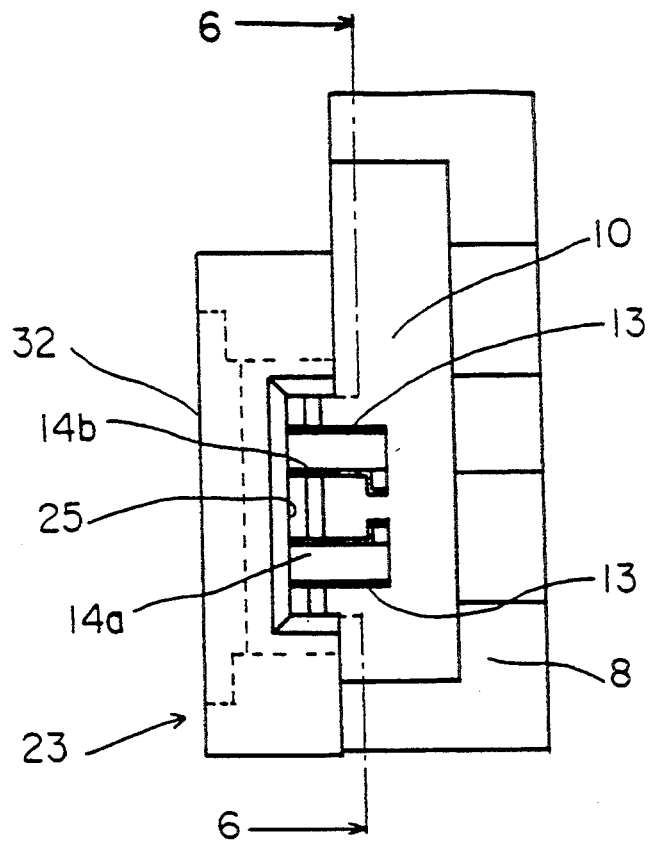
FIG. 4 is a side view of the connector housing as seen in the direction indicated by R in FIG. 2.

Referring to FIG. 1, a small-sized electric motor 1 comprises a hollow cylinder casing 2 of soft metal magnetic material, a permanent magnet 3 fixed to the inner surface of the hollow cylinder 2, and a rotor 6 in the hollow cylinder 2. The rotor 6 comprises an armature 4 facing the permanent magnet 3, and an associated rectifier 5.

Figure 5:
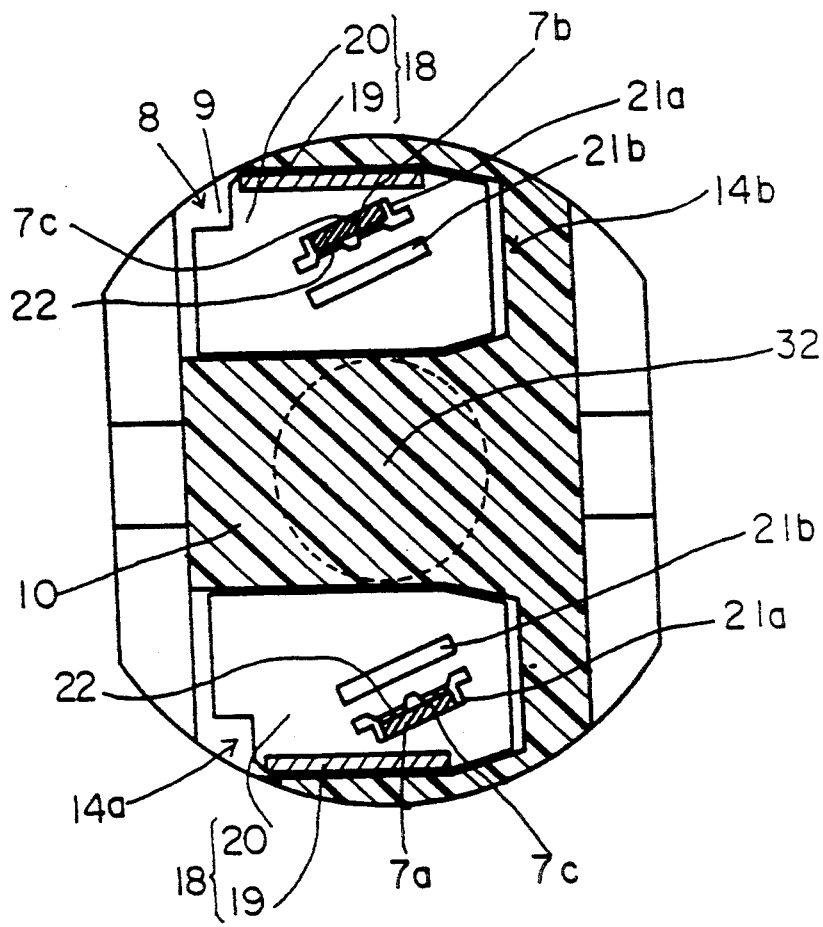
FIG. 5 is a longitudinal section of the connector housing taken along the line 5—5 as seen in the direction indicated by arrows in FIG. 3.
Figure 6:
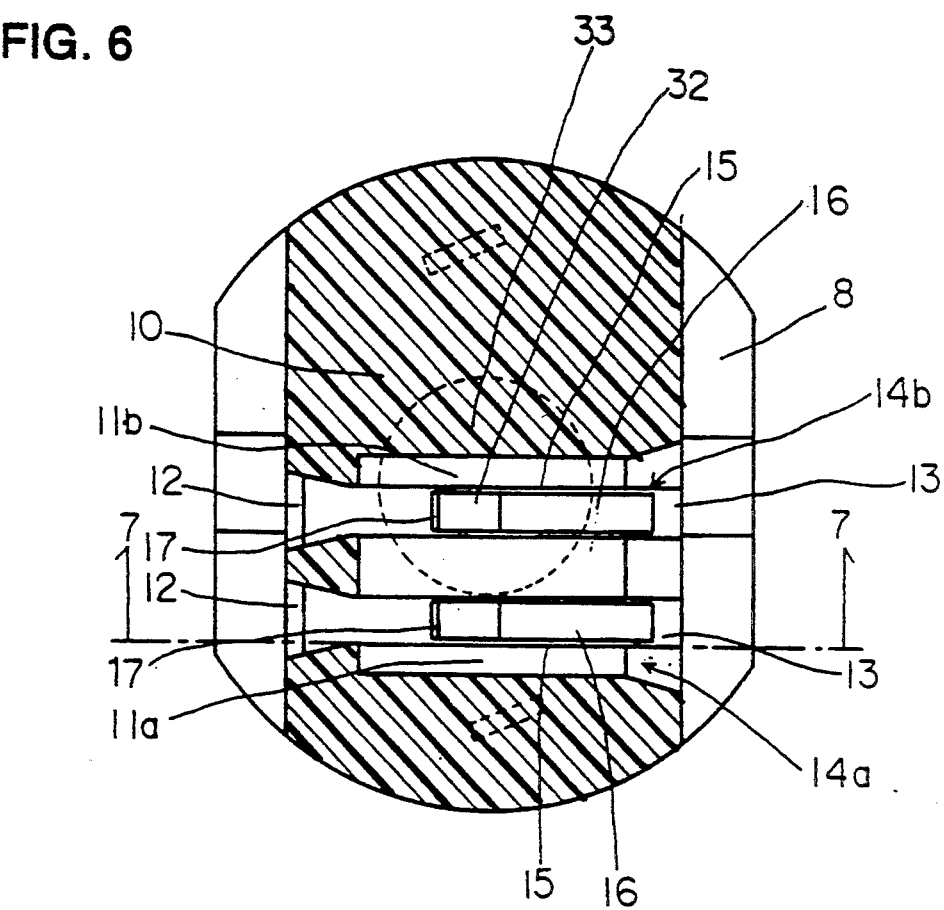
FIG. 6 is a longitudinal section of the connector housing taken along the line 6—6 as seen in the direction indicated by arrows in FIG. 6.
Figure 7:
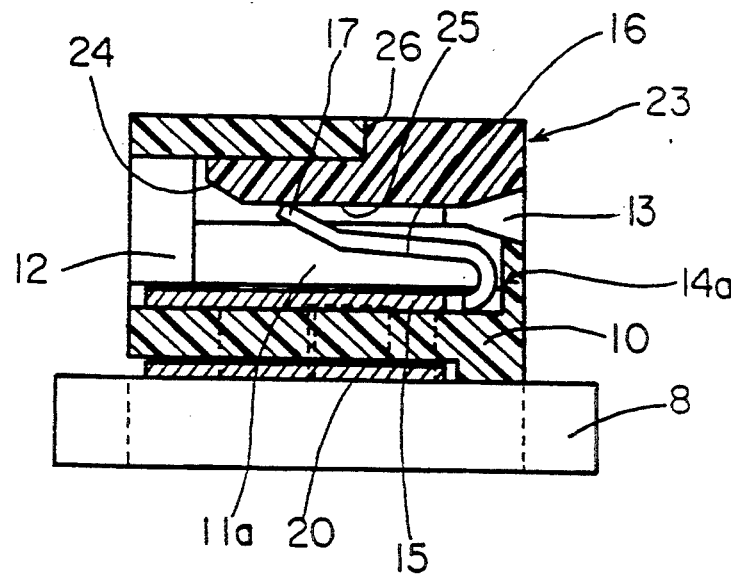
FIG. 7 is a longitudinal section of the connector housing taken along the line 7—7 as seen in the direction indicated by arrows in FIG. 6.

The input terminals 7a and 7b, as shown in FIG. 5, of the small-sized electric motor are electrically connected to the brushes, which are positioned in contact with the rectifier 5 of the armature 4. These input terminals 7a and 7b extend beyond surface 9 of the end plate 8 of the hollow cylinder 2. An electric connector housing 10 is integrally connected to the end plate 8.

A pair of terminal-mounting spaces 11a and 11b are made laterally side by side. Each terminal-mounting space 11a or 11b has a terminal-insertion opening 12 on one side and a flat flexible cable (FFC) insertion opening 13 on the other side. In this example each terminal-mounting space 11a or 11b is parallel with a plane in which the end plate 8 lies. The FFC insertion opening 13 is made in a lateral direction 35 perpendicular to the direction in which the connector housing 10 is applied to the motor casing 2, thus permitting substantial reduction of the height H of the assembly.

Figure 10:
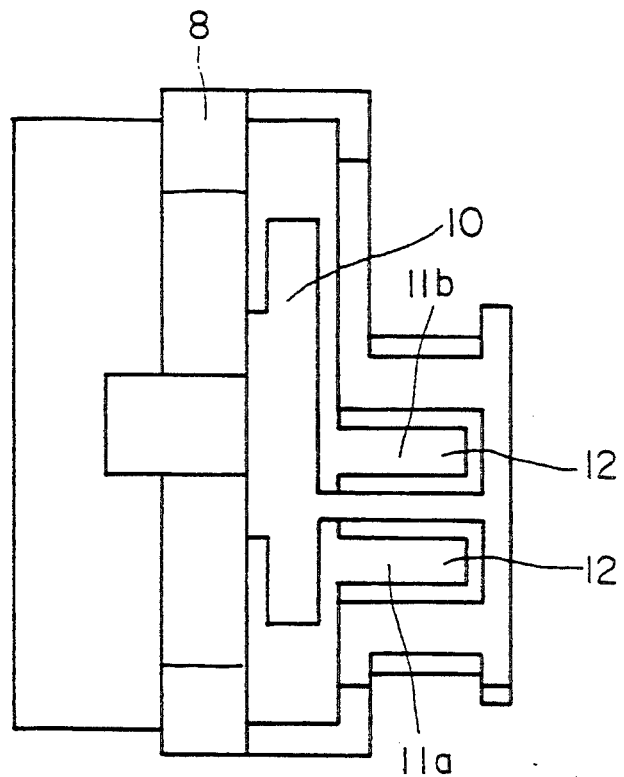
FIG. 10 is a side view of the connector housing as seen in the direction indicated by S in FIG. 8.
Figure 11:
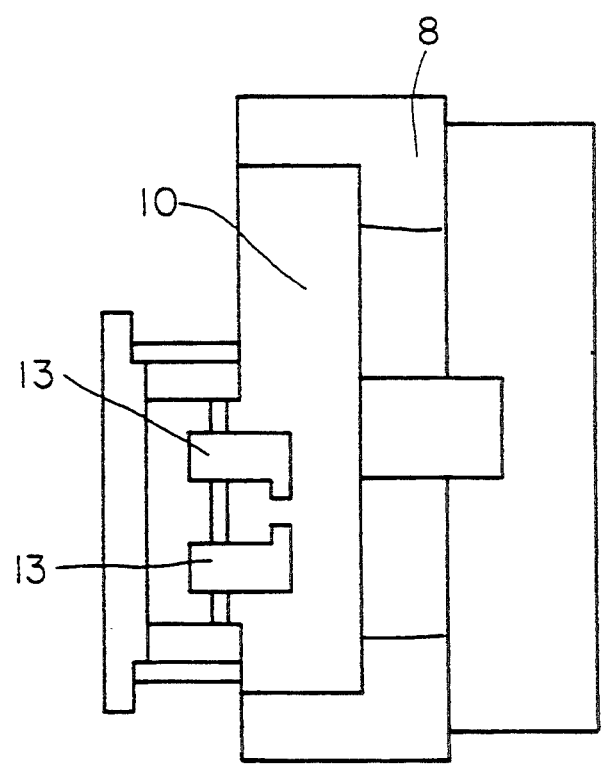
FIG. 11 is a side view of the connector housing as seen in the direction indicated by T in FIG. 8.
Figure 16:
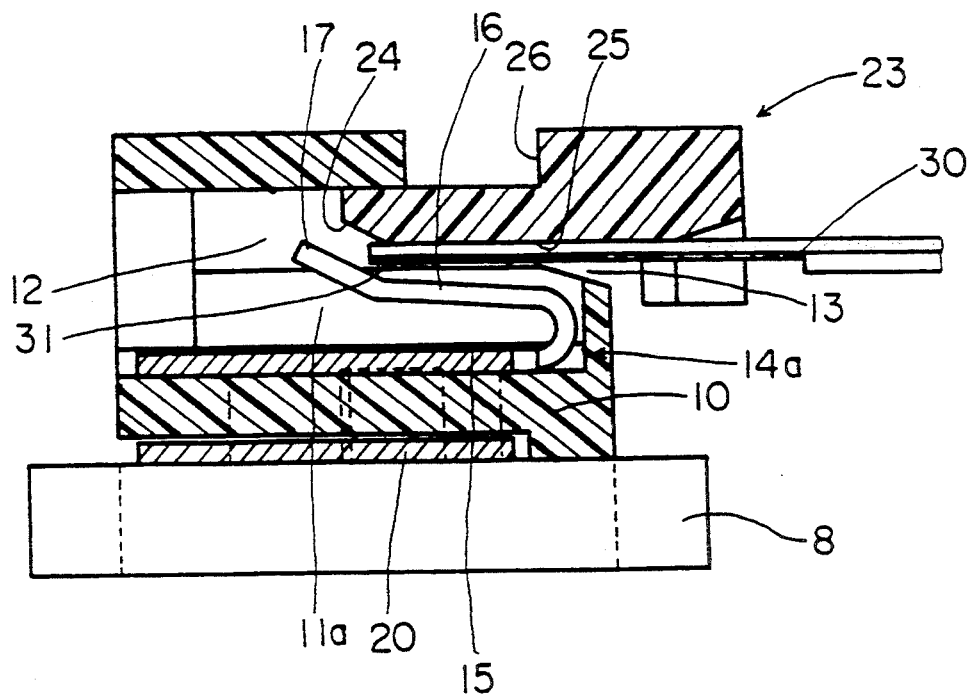
FIG. 16 shows, in section, the electric connector housing of the small-sized electric motor along with the actuator, showing how an FFC is inserted in or removed from the electric connector housing.
Figure 17:
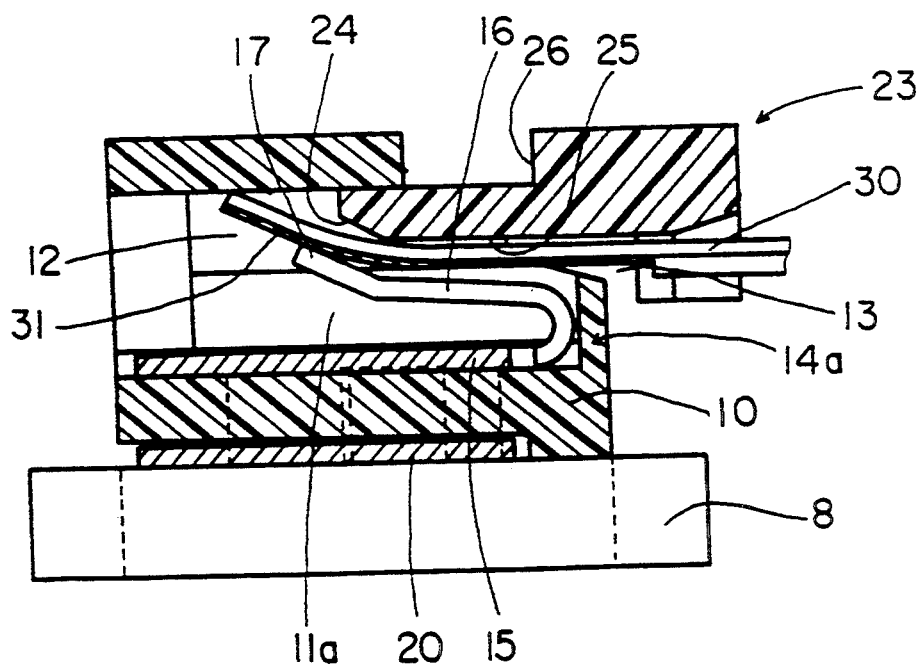
FIG. 17 shows, in section, the electric connector housing of the small-sized electric motor along with the actuator, showing the FFC fully inserted in the electric connector housing.
Figure 18:
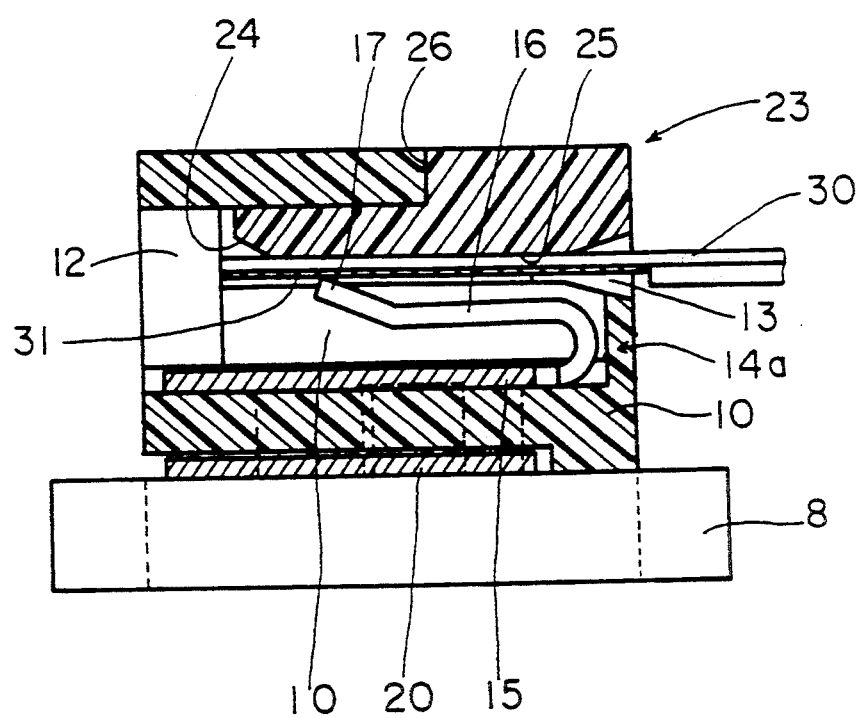
FIG. 18 shows, in section, both of the FFC and the actuator fully inserted in the electric connector housing.

Referring to FIGS. 1 to 7, the terminals 14a and 14b are inserted into the terminal-mounting spaces 11a and 11b of the connector housing 10. FIGS. 10 and 11 show the connector housing 10 without the terminals 14a and 14b inserted. FIGS. 16, 17 and 18 show the connector housing 10 with the terminals 14a and 14b inserted.

Since the terminals 14a and 14b have a similar shape, it suffices that only one of these terminals be described below. Terminal 14a which is similar in shape and function to terminal 14b comprises a base section 15, a "U"-shaped contact beam 16 integrally connected to and extending up and bent from the base section 15, a vertical side section 19 integrally connected to and extending down from the base section 15 and a horizontal section 20 integrally connected to and extending from the vertical side section 19 horizontally in parallel with the overlying base section 15. The vertical side section 19 and the horizontal section 20 are referred to together as making up a tail 18.

The terminal contact 14a has slits 21a and 21b in its horizontal section 20. As seen from FIG. 13, the slit 21a has a notched or sawtooth edge 22 to make an electric connection with one or the other input terminal 7a or 7b of the electric machine or apparatus. The other slit 21b is parallel to the slit 21a, thereby facilitating the yieldingly-bending of the notched or sawtooth edge 22 of the slit 21a upon insertion of the input terminal 7a or 7b of the small-sized electric motor 1.

Figure 8:
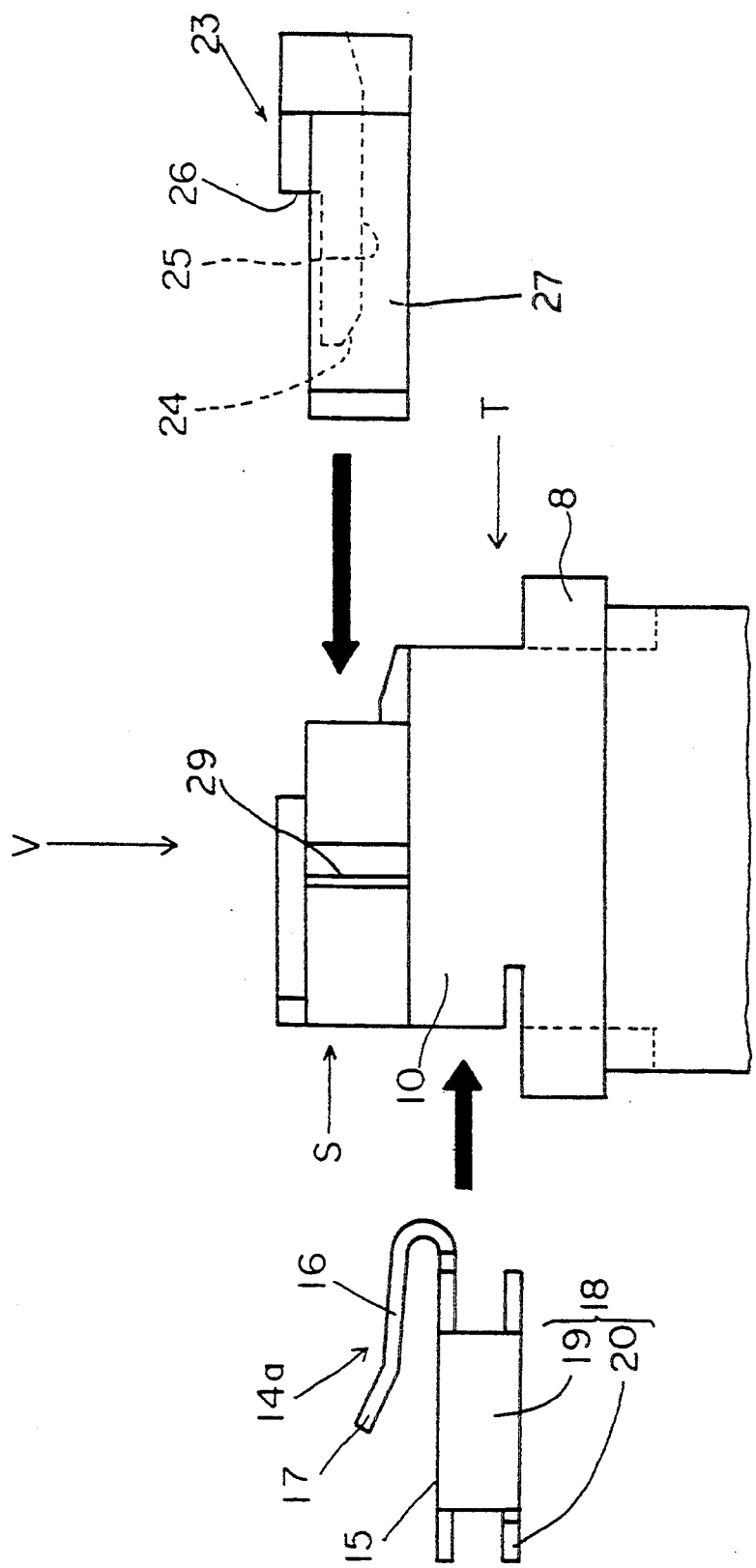
FIG. 8 shows how terminal contacts are mounted in the connector housing, and how an actuator is inserted in the connector housing.
Figure 9:
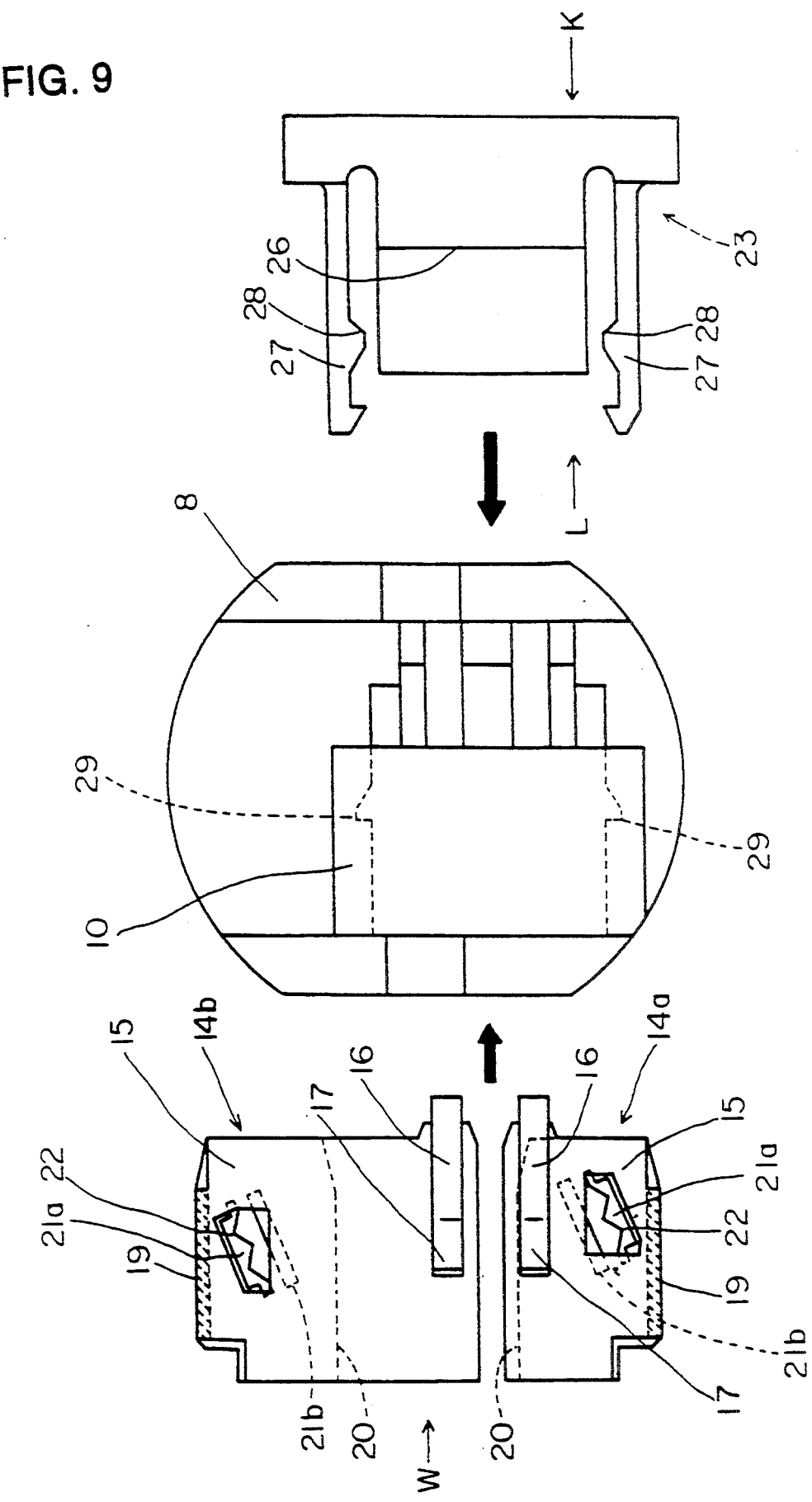
FIG. 9 is similar to FIG. 8, but showing the terminal contacts, the connector housing and the actuator as seen in the direction indicated by V in FIG. 8.

The terminals 14a and 14b are inserted in the terminal-mounting spaces 11a and 11b of the connector housing 10 with their "U"-shaped contact beams 16 directed to the terminal-inlet openings 12 of the terminal-mounting spaces 11a and 11b as shown in FIGS. 8 and 9 by inserting the terminals 14a and 14b in the terminal-mounting spaces 11a and 11b until the terminals 14a and 14b are fully inserted into the terminal-mounting spaces 11a and 11b as seen from FIGS. 1 to 7. In this fully inserted position the slits 21a of the horizontal sections 20 of the terminals 14a and 14b will be put in alignment with the input terminals 7a, 7b of the small-sized electric motor 1 when the input terminals 7a, 7b are attached to the end plate 8. After the terminals 7a and 7b are inserted in slits 21a not only will an electrical connection be made between terminals 14a and 14b and the input terminal 7a and 7b but also the connector housing 10 is fixed to the motor casing 2.

Figure 14:
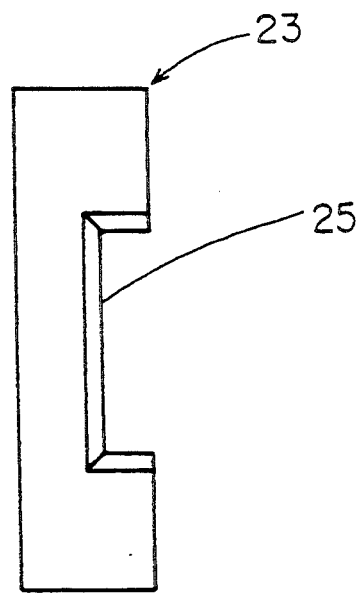
FIG. 14 is a front view of the actuator as seen in the direction indicated by arrow K in FIG. 9.
Figure 15:
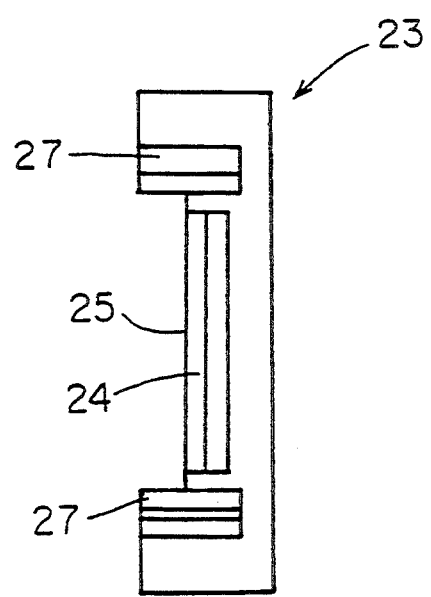
FIG. 15 is a rear view of the actuator as seen in the direction indicated by arrow L in FIG. 9.

An actuator 23 is used to connect or disconnect conductors 31 on the FFC 30 to or from the contact portions 17 of the respective contact beams 16. Electric connectors having actuators as shown in FIGS. 1 to 7 show the connector housing 10 having terminals 14a and 14b mounted therein, and FIGS. 8 and 9 show how the terminals 14a and 14b are inserted in the connector housing 10. FIGS. 14 and 15 show an actuator 23 having a tapered front 24 and a flat bottom 25. Also, it has a stopper section 26 rising from the ceiling surface to cause the actuator 23 to stop when fully inserted in the connector housing 10. As best seen in FIG. 9, the actuator 23 has lock arms 27 integrally connected to its opposite sides. Each lock arm 27 has a lock projection 28 formed on its inner side. Thus, when the actuator 23 is fully inserted in the connector housing 10, the lock projections 28 of the lock arms 27 are caught by counter projections 29 of the connector housing 10, thereby holding the actuator 23 in position.

FIGS. 16 to 18, generally depict the manner in which conductors 31 on FFC 30 are connected to and disconnected from the input terminals 7a and 7b of a small-sized electric motor 1.

As shown in FIG. 16, the front end of the actuator 23 is inserted in the inlet opening 13 of the connector housing 10 with an FFC 30 laid under the bottom surface 25 of the actuator 23. Specifically, two stripped conductors 31 extend from the FFC 30 at the same interval as the contact ends 17 of the terminals 14a and 14b in the connector housing 10, and are pushed toward the contact beams 16 of the terminals 14a and 14b in the connector housing 10.

As shown in FIG. 17, the FFC 30 is pushed forward until the stripped conductors 31 of the FFC 30 have been inserted along the rising extensions of the "U"-shaped contact beams 16. In this position the stripped conductors 31 of the FFC 30 extend beyond the tapered end 24 of the actuator 23, but the stripped conductors 31 of the FFC 30 are not pressed with a high force against the contact ends 17 of the terminals 14a and 14b by the actuator 23. In this condition the contact ends 17 of the contact beams 16 will not rub against the stripped conductors 31 of the FFC 30 in the course of insertion.

As shown in FIG. 18, the actuator 23 is fully inserted until its stopper 26 has been caught by the connector housing 10. Then, the lock projections 28 of the opposite lock arms 27 are brought into engagement with the opposite counter projections 29 of the connector housing 10. In this position the stripped conductors 31 of the FFC 30 are pushed against the contact extensions 17 of the contact beams 16, and then the contact beams 16 are yieldingly bent down, thereby causing the resilient force to push themselves against the overlying conductors 31 of the FFC 30 with a force enough to assure good electric connection with the conductors 31 of the FFC 30. The conductors of the FFC can be disconnected from the terminal contacts 14a and 14b by operating the actuator 23 in the reversed order from FIG. 17 to FIG. 15 via FIG. 16. In the complete insertion of the FFC in the connector housing 10 the conductors 31 of the FFC 30, the contact ends 17 of the terminal contacts 14a and 14b and the input terminals 7a and 7b of the small-sized electric motor 1 are electrically connected.

In this particular example an FFC is described as having conductors arranged parallel at a predetermined interval or pitch, but two FFCs each having a single conductor may be used. Also, flat flexible cables called FPC or other cables for use in printed circuit boards such as PCBs can be equally used.

It will be understood that the invention may be embodied in other specific forms without department from the spirit or central characteristics thereof. The present examples and embodiments, therefore, are to be considered in all respects as illustrative and not restrictive, and the invention is not to be limited to the details given herein.

We claim:

1. A small-sized electric motor equipped with an electric connector which permits electrical connection and disconnection of exposed conductors of at least one insulated wire to said motor wherein the improvement comprises:

said motor including a hollow cover formed into a generally cylindrical shape and having at least one end having two elongated terminals passing therethrough and electrically connected to said motor, said connector including a dielectric housing having openings adapted to receive said elongated terminals of said motor and a slot, communicating with said openings and located in a plane perpendicular to the longitudinal axis of said elongated terminals, adapted to receive said insulated wire and an actuator, female terminals, mounted in said housing and having two mating ends, one mating end including a generally planar base portion that is transverse to the longitudinal axis of the elongated motor terminal, having an aperture formed in the planar portion to receive one elongated motor terminal, said other mating end including a flexible arm extending from said planar base portion bent to extend into the conductor receiving slot, and said actuator adapted to be inserted into said slot in both a partially inserted and a fully inserted position, said actuator, in said partially inserted position, defining a clearance in the slot between the terminals and the actuator allowing the insulated wires to freely pass into and out of said clearance and, in said fully inserted position, forces said exposed conductors into contact with the bent flexible arms of the female terminals extending into the conductor receiving slot thereby making a good electrical connection between the female terminals and the cooperating respective exposed conductors.

2. A small-sized electric motor equipped with an electric connector according to claim 1 wherein said actuator has lock arms integrally formed on opposite sides, each of said lock arms having a lock projection adapted to be locked into a shoulder projection on said connector housing when said actuator is fully inserted in said connector housing slot.

* * * * *